April 16, 1935.   A. S. BROWN   1,998,268
MEANS FOR OPERATING TARGET TRAPS
Filed July 28, 1931   2 Sheets-Sheet 1
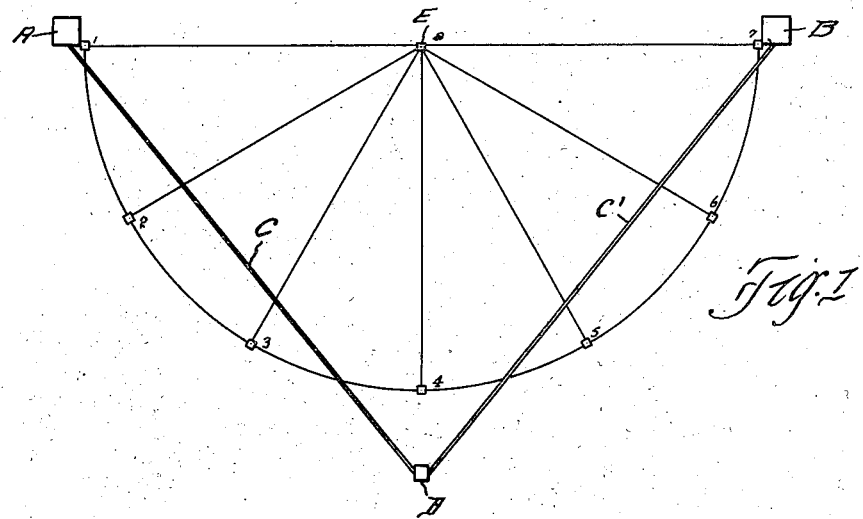
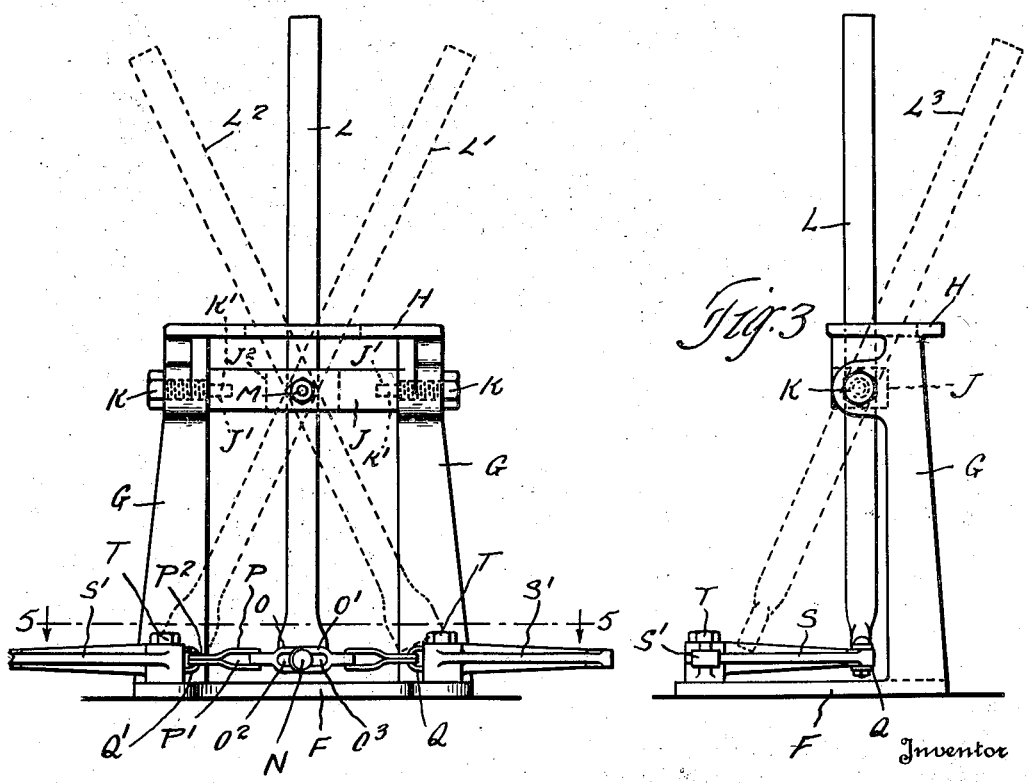

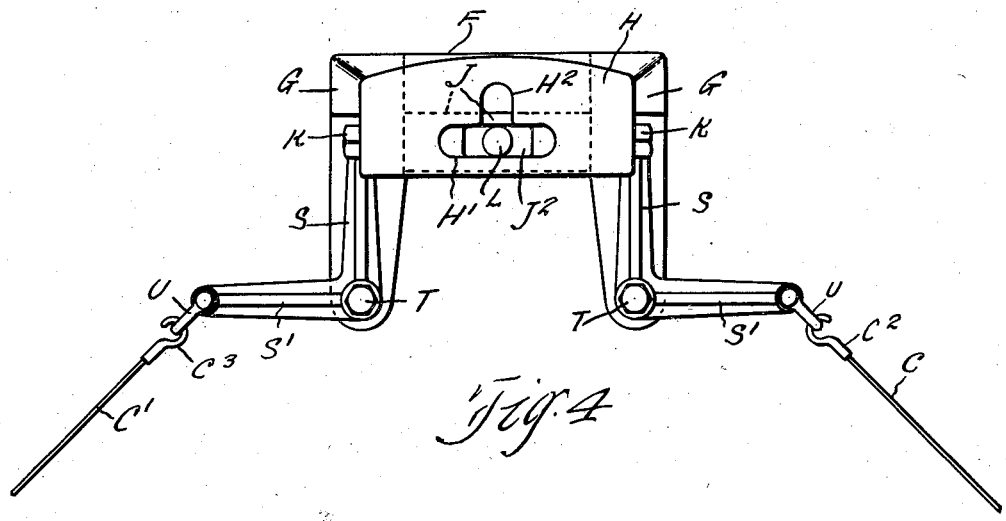
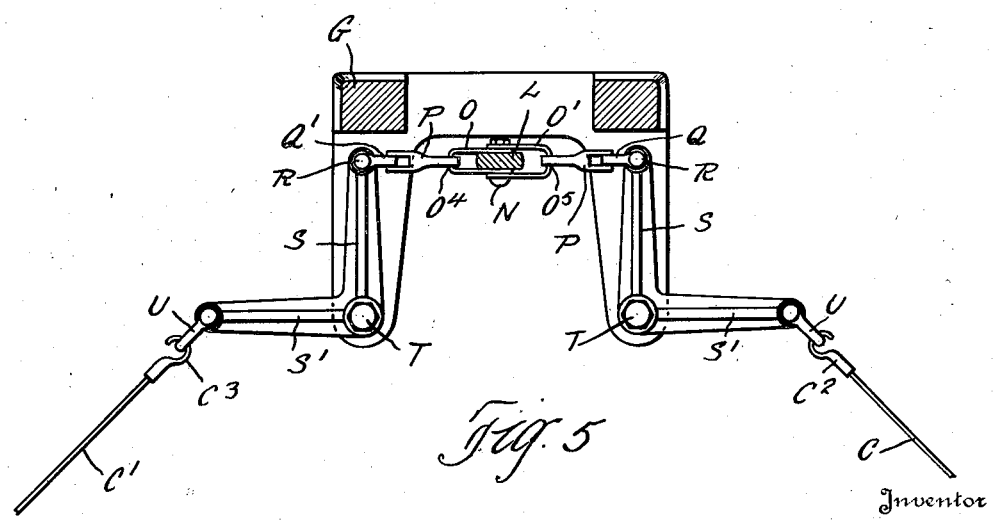

Patented Apr. 16, 1935

1,998,268

UNITED STATES PATENT OFFICE 1,998,268

MEANS FOR OPERATING TARGET TRAPS

Arthur S. Brown, Bridgeport, Conn., assignor, by mesne assignments, to Remington Arms Company, Inc., Bridgeport, Conn., a corporation of Delaware Application July 28, 1931, Serial No. 553,551

4 Claims. (Cl. 124—3)

This invention relates to pulling mechanism for target traps, and more particularly to the pulling mechanism which is employed for the purpose of operating traps in what is known as "skeet" shooting. This type of shooting is employed in connection with two target traps, one of them being located in what is termed the "high house" and the other being located in what is termed the "low house". As implied by the language, one of the houses is higher than the other and the trap therein is supported at a considerably greater elevation from the ground than is the trap in the other house. As the shooting referred to is practiced, a shooter takes a series of different positions with reference to the two traps and the trap puller usually employs three levers, one of which is used for operating the trap in the "high house", another of which operates the trap in the "low house", and the third of which operates both traps simultaneously.

My invention consists in mechanism and connections whereby the traps may be operated separately as well as simultaneously by means of a single lever.

In the drawings hereof, Fig. 1 is a diagrammatic plan view of an equipment for "skeet" shooting, showing the positions of the "high-house" and "low-house" traps and of the pulling station and also showing various stations which are taken by the shooters; Fig. 2 is a front elevation of a representative embodiment of the invention. Fig. 3 is a side elevation of the same mechanism shown in Fig. 2. Fig. 4 is a plan view of the same mechanism shown in Fig. 2. Fig. 5 is a section substantially on the line 5—5 of Fig. 2.

Referring first to Fig. 1, A denotes the high-house trap and B the low-house trap, the traps being of any approved construction and each adapted to be operated by means of flexible connections C and C', respectively, extending therefrom to the pulling station, indicated generally at D. The field is semi-circular, being described from a point E midway between the traps 1 and 2 on a radius extending nearly to each such trap. On the circumference of the semi-circle thus described there are various stations to be occupied successively by the shooter, these stations being indicated at 1, 2, 3, 4, 5, 6 and 7 respectively and being preferably equi-distantly apart. In addition, midway between the stations 1 and 7 is located another station, designated 8, corresponding with the center from which the semicircle defining the field is described.

In operation the shooter takes a position at each station in succession, and the targets are thrown alternately as well as simultaneously from the traps at A and B.

In order to simplify and improve the manner of throwing targets alternately and simultaneously from the traps A and B, I provide the following construction: At the station D there is a pulling stand comprising a base F which supports two upright members or standards G. H denotes a table on top of the standards G and which is provided in its top with a T-slot H', H², the slot H' being elongated and the slot H² extending from the middle of the slot H' and constituting the stem of the T. Below the table H is a pivot block J having opposed axial openings J' at opposite ends thereof whereby it is mounted for rocking movement on the studs K' carried by bolts K which are threaded through the standards G. The block J is provided with a slot J² extending vertically through the central portion thereof and adapted to register with the slot H' in the table H.

L denotes the pulling lever for the traps. This lever extends upwardly through the slots J² and H' and is pivotally connected to the block J by means of a bolt M extending transversely across the slot J². The bottom of the lever L is connected by a bolt N to a loop shown as formed by two opposed U-shaped members O and O', the legs of which members overlap and are connected to the lever by a bolt N. The overlapping sides of the loop members O and O' have each a slot, indicated respectively at O² and O³ extending from the ends thereof toward the portions O⁴, O⁵, respectively, which connects the opposed sides of each member.

P denotes links each having openings P', P² at opposite ends thereof and arranged at right angles to each other. The openings P' of the links receive the corresponding portions O⁴ and O⁵ respectively of the loop O, and the openings P² of the links receive the loops Q' respectively of links Q each of which has its opposite end pivotally connected by a pin R with one of the arms S of a bell-crank lever pivoted to the platform F by a bolt T, the other arms S' of said levers being connected at their outer ends by shackles U with loops C² and C³ carried by the ends of the pull wires C and C' respectively.

With the parts constructed and arranged as described, the operation will be readily understood. Assuming that a shooter is at any one of the stations shown on Fig. 1 and that it is desired to throw a target from the trap A, the lever L will be moved in the slot H to the position shown in broken lines at L' (Fig. 2) thereby to exert a pull on the wire C, this pull being exerted by moving the lever in the slot H' so that the bottom of the lever will exert a pull upon the wire C through the loop section O' and the bell crank lever S, S'.

When it is desired to throw a target from the trap B, the lever is rocked in the opposite direction to the position shown in broken lines at $L^2$ (Fig. 2) thereby exerting a pull upon the wire C' through the loop section O and the bell crank lever. The slots $O^2$ and $O^3$ allow the movement of each loop section without movement of the other loop section.

When it is desired to throw targets simultaneously from both traps A and B, the lever is rocked backwardly to the broken line position $L^3$ shown in Fig. 3, whereby its lower end will exert a pull simultaneously upon the wires C and C', by simultaneously rocking the bell-crank levers S, S', the lever moving into the central branch $H^2$ of the slot during this operation.

It will be noted that the pull wires which are connected to the ends of the bell-crank levers diverge from each other and are connected each to the trap adjacent the sides of the base on which it is mounted. This enables the pull wires to be led through pipes (which may, if desired, be embedded in the field) and also provides a more available space for the shooters, since the trap puller is located at substantially the middle of the semi-circular field at the opposite ends of which field the traps are located.

From the foregoing, it will be evident that I have produced an extremely simple and efficient construction whereby traps may be thrown both successively and simultaneously from the trap stations A and B; and the results referred to are secured by the operation of a single lever whereas I am informed that, prior to my invention, it has been necessary to employ three levers for effecting these same operations.

Having thus described my invention, what I claim is:

1. The combination, with a pair of spaced target traps, of a pulling station, a member connected with each of said traps and leading to said station, a stand at said station having a T-shaped slot at the top thereof, a block pivotally supported by said stand beneath the top thereof, a lever extending through the said slot and pivotally connected intermediate of its ends to the said block, and connections between one end of the lever and the said members whereby, when the lever is moved in one direction in the said slot one of said members will be operated thereby, and when moved in the opposite direction in said slot the other member will be operated thereby and, when moved into the stem portion of the T-slot, both of the said members will be operated.

2. The combination, with a pair of spaced target traps, of a pulling station, a member connected with each of said traps and leading to said station, a stand at said station having a T-shaped slot at the top thereof, a block pivotally supported at its ends by said stand beneath the top thereof and having a slot therethrough adapted to register with the main portion of the slot in the top thereabove, a lever extending through the slot in the top of the stand and through the slot in the pivoted block and pivotally connected to said block, and connections between an end of the lever and the said members whereby, when the lever is moved in one direction in the said slot, one of said members will be operated thereby, and when moved in the opposite direction in said slot the other member will be operated thereby, and when moved into the stem portion of the T-slot, both of the said members will be operated thereby.

3. Apparatus for selectively effecting the separate and simultaneous release of a pair of spaced target traps comprising the combination with said traps of a supporting stand spaced from both said traps, a lever pivotally supported in said stand for movement in opposite directions from a neutral position and for movement perpendicular to said directions, means for preventing other movements of said lever, and connections from said lever to each of said traps whereby movement of said lever in one direction from neutral position releases one trap, movement of said lever in another direction releases the second trap, and movement in the third direction releases both traps.

4. Trap shooting apparatus, comprising a plurality of target traps, a controlling element, flexible means connecting said element to said traps, a universal mounting for said element and means providing a plurality of guides selectively engageable by said element to guide the latter for movement to operate one or more of said traps.

ARTHUR S. BROWN